(12) United States Patent
Fernandez et al.

(10) Patent No.: US 8,559,537 B2
(45) Date of Patent: Oct. 15, 2013

(54) SPECTRAL-TEMPORAL AVERAGING FOR IEEE 802.11P DYNAMIC CHANNEL EQUALIZATION

(75) Inventors: Joseph Fernandez, Pittsburgh, PA (US); Daniel D. Stancil, Raleigh, NC (US); Fan Bai, Ann Arbor, MI (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 545 days.

(21) Appl. No.: 12/778,658

(22) Filed: May 12, 2010

(65) Prior Publication Data

US 2011/0280325 A1   Nov. 17, 2011

(51) Int. Cl.
*H04B 1/10* (2006.01)
(52) U.S. Cl.
USPC .......................................................... 375/260
(58) Field of Classification Search
USPC ................... 375/260–262, 265; 370/208, 210
See application file for complete search history.

(56) References Cited

U.S. PATENT DOCUMENTS

| | | | |
|---|---|---|---|
| 6,570,910 B1 * | 5/2003 | Bottomley et al. ........... | 375/148 |
| 7,486,726 B2 | 2/2009 | Alexander et al. | |
| 2002/0196866 A1 * | 12/2002 | Diehl et al. ................... | 375/316 |
| 2004/0184399 A1 | 9/2004 | Chiou | |
| 2006/0245349 A1 * | 11/2006 | Vrcelj et al. .................. | 370/210 |
| 2010/0067366 A1 * | 3/2010 | Nicoli ........................... | 370/210 |
| 2010/0260248 A1 * | 10/2010 | Hung et al. ................... | 375/224 |

OTHER PUBLICATIONS

P. Alexander, D. Haley, and A. Grant, "Outdoor mobile broadband access with 802.11," IEEE Commun. Mag., vol. 45, No. 11, pp. 108-114, Nov. 2007.
T. Kella, "Decision-directed channel estimation for supporting higher terminal velocities in OFDM based WLANs," In Proc. IEEE Global Telecomm. Conf., vol. 3, pp. 1306-1310, Dec. 2003.
Y.-H. Cheng, Y.-H. Lu, and C.-L. Liu, "Adaptive channel equalizer for wireless access in vehicular environments," in Proceedings of the 6th International Conference on ITS Telecommunications (ITST '06), pp. 1102-1105, Chengdu, China, Jun. 2006.
S.-K. Lee , Y.-A. Kao , and H.-W. Chen, "Performance of a robust inner receiver with frequency domain LMS equalizer for DSRC systems," in Proceedings of the 2006 International Conference on Wireless Communications and Mobile Computing, Vancouver, British Columbia, Canada, Jul. 2006.
Chang, Ming-Xian "Detection of OFDM Signals in Fast-Varying Channels With Low-Density Pilot Symbols" IEEE Transactions on Vehicular Technology, vol. 57, No. 2, Mar. 2008, pp. 859-872.

* cited by examiner

*Primary Examiner* — Young T. Tse
(74) *Attorney, Agent, or Firm* — John A. Miller; Miller IP Group, PC

(57) ABSTRACT

A system and method for providing dynamic channel equalization in V2V and V2I communications systems. The method includes separating the channel bandwidth of a message into a plurality of subcarriers having different subcarrier frequencies, where the subcarriers include data subcarriers and pilot subcarriers. The method demodulates the message in the receiver to extract symbols from the message and determines channel estimation frequency responses using a least-squares estimation process and the extracted symbols for the pilot subcarriers. The channel estimation frequency responses of either the pilot subcarriers, the pilot subcarriers and some data subcarriers, or the pilot subcarriers and all data subcarriers are used to generate updated channel estimation frequency responses, and a new channel estimation frequency response is generated for each extracted signal using a previous channel estimation frequency response and the updated channel estimation frequency response. The extracted symbols are equalized using the new channel estimation frequency response.

20 Claims, 6 Drawing Sheets

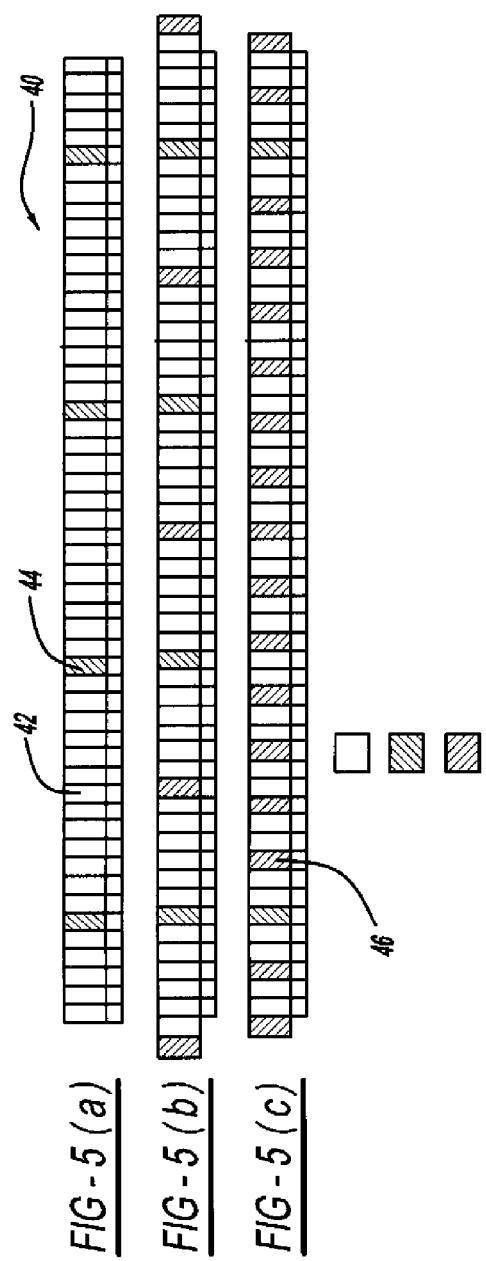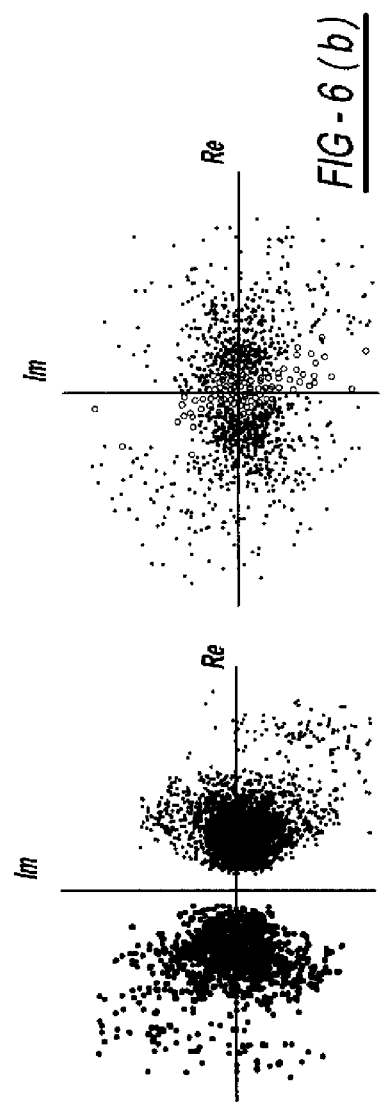

SPECTRAL-TEMPORAL AVERAGING FOR IEEE 802.11P DYNAMIC CHANNEL EQUALIZATION

BACKGROUND OF THE INVENTION

1. Field of the Invention

This invention relates generally to a system and method for providing equalization of a communications channel and, more particularly, to a system and method for providing dynamic channel equalization in an orthogonal frequency division multiplexing (OFDM) protocol for a vehicle-to-vehicle (V2V) and vehicle-to-infrastructure (V2I) dedicated short range communications (DSRC) system that interpolates pilot subcarriers and/or data subcarriers in both frequency and time.

2. Discussion of the Related Art

As vehicles have become more and more technologically advanced, a need has arisen for a reliable vehicle-to-vehicle (V2V) and vehicle-to-infrastructure (V2I) communications system, such as a dedicated short range communications (DSRC) system. By using vehicular networks of this type, vehicles can share traffic flow information, alert other vehicles of hazardous road conditions, help drivers be more aware of neighboring vehicles, etc. In addition, reliable vehicular communications is essential to aid in the operation of autonomously driven vehicles.

In digital communications systems of the type referred to above, the digital data being transmitted is modulated onto a carrier wave to include information symbols that are characterized as orthogonal sinusoids that identify the data in the transmitted messages. The various components in the transmitter, the transmission medium and the receiver cause various types of distortions in the transmitted signal. These distortions include signal dispersion or smearing that causes pulses in the received signal to not be well defined. If the distortion is not corrected in the receiver during the demodulation process, data can be lost, resulting in unreliable transmissions. Therefore, processes, known as channel equalization, are performed in the receiver on the received signal to remove the distortions and correct for the effects of the channel.

The IEEE 802.11p communications standard is currently the core communication protocol for vehicular networks. The 802.11 communications standard employs a protocol stack including various layers, such as a physical layer, a medium access control layer, etc., that each perform different operations, as is well understood by those skilled in the art. This communications standard encodes the digital data that is to be transmitted in the transmitter and deciphers decoded data when it is received at a receiver. For the physical layer (PHY), the IEEE 802.11p standard uses orthogonal frequency division multiplexing (OFDM), where OFDM is a spectrally efficient multi-carrier modulation scheme. OFDM separates the usable bandwidth, typically 10-20 MHz, into 52 orthogonal sub-channels or subcarriers at different frequencies. Of those 52 subcarrier frequencies, 48 subcarrier frequencies are used for data transmission and four subcarrier frequencies are used for pilot transmission. The pilots are used for center frequency offset tracking, as is well understood by those skilled in the art.

The subcarriers within an OFDM signal are orthogonal to each other in both time and frequency domains, such that they do not interfere with each other. OFDM employs a cyclic prefix, also known as a guard interval, at the beginning of each symbol. This cyclic prefix maintains subcarrier orthogonality and is used to prevent inter-symbol interference. The cyclic prefix thus helps protect OFDM from multipath effects.

The 802.11p PHY is similar to the 802.11a PHY with two primary differences, namely, the 802.11p standard uses a 10 MHz bandwidth, where the 802.11a standard uses 20 MHz, and the 802.11p standard uses an operating frequency of 5.9 GHz, where the 802.11a standard uses an operating frequency of 5 GHz. When using a binary phase-shift keying (BPSK) modulation scheme with ½ coding rate, this yields a data rate of 3 Mb/s.

All of the above described features make the 802.11p standard a good choice for a high data rate communications protocol for an outdoor channel. However, performance of the 802.11p standard over V2V channels is far from optimal. In previous work, the statistical characteristics of the V2V channel were measured, and the feasibility of using different time scaled OFDM waveforms was studied. The primary detriment to performance of the 802.11p standard is the channel's short coherence time. Because the 802.11p standard does not restrict the length of message packets, a short coherence time is a major concern. Short packets will naturally have better performance, whereas longer packets will suffer as a result of the short coherence time of the channel. Therefore, enhanced channel equalization for the 802.11p standard is needed in an effort to reduce packet error rate (PER). Improving the performance at the physical layer will result in improved performance at all layers.

The IEEE 802.11p PHY is based on the PHY found in the 802.11a standard. This standard was designed for indoor use, and as such performs well for indoor environments. However, outdoor environments feature a more dynamic channel and a longer delay spread in the signal. This leads to the guard interval in the 802.11a standard being too short for outdoor use. Several methods for addressing an excessively long delay spread in the 802.11p standard are known. However, the 802.11p standard has a guard interval that is twice as long as the guard interval in the 802.11a standard. Based on channel measurements, the long delay spread is not a significant problem affecting the 802.11p standard, and therefore, the short coherence time is more important.

Several techniques exist to improve the performance and accuracy of the initial channel estimate in packetized message transmissions. While this type of technology is important for the 802.11a standard, the short coherence time of a V2V channel nullifies any gains realized by a more accurate initial estimation.

For packetized OFDM transmissions, tracking the channel is important. Some work has been done on adaptive channel tracking algorithms for a DSRC system and/or the 802.11 standard. Decision directed channel feedback from data symbols is determined by decoding and demodulating symbols to re-estimate the channel throughout the packet. This method is more complex in that it requires Viterbi decoding and remodulation of OFDM symbols as equalization is taking place. A similar technique has been employed for 802.11a packets that are applied to a vehicular environment. This works in tandem with a time domain equalizer that helps to reduce the effects of multipath and inter-symbol interference. An adaptive technique using vehicle speed, signal-to-noise ratio and packet length has been proposed to aid in tracking the channel using data symbols. A least mean squares (LMS) algorithm has been used in conjunction with pilot data to correct for residual carrier frequency offset and channel conditions throughout the length of the packet.

SUMMARY OF THE INVENTION

In accordance with the teachings of the present invention, a system and method are disclosed for providing dynamic channel equalization in V2V and V2I communications systems that employ orthogonal frequency division multiplexing protocols. The method includes separating the channel bandwidth of a message into a plurality of subcarriers having different subcarrier frequencies, where the subcarriers include data subcarriers and pilot subcarriers. The transmission in time is separated into a plurality of symbols where the transmission may include both data symbols and pilot symbols. The transmission can thus be visualized as a two-dimensional matrix where the rows correspond to subcarriers, and the columns correspond to symbols. In general, any cell can be a pilot, and the pilots are spread across the matrix in such a way that each row and column may have a combination of data cells and pilot cells. The method demodulates the message in the receiver to extract symbols from the message and determines channel estimation frequency responses using a least-squares estimation process and the extracted symbols for the pilot subcarriers. The channel estimation frequency responses of at least the pilot subcarriers are interpolated to generate updated channel estimation frequency responses, and a new channel estimation frequency response is generated for each extracted signal using a previous channel estimation frequency response and the updated channel estimation frequency response. The extracted symbols are equalized using the new channel estimation frequency response. One or more of the data subcarriers can also be interpolated to increase the accuracy of the equalization, where the data subcarrier can be compared to a confidence parameter threshold so that low accuracy data subcarriers are not used in the equalization. The pilot subcarriers in each symbol may be different, and some symbols may not contain pilot subcarriers. In this case, interpolation across the symbols in time can be used to increase the accuracy of the equalization.

Additional features of the present invention will become apparent from the following description and appended claims, taken in conjunction with the accompanying drawings.

BRIEF DESCRIPTION OF THE DRAWINGS

FIGS. 5(a) to 5(c) show comb pilot and copilot interpolation schemes;

FIGS. 6(a) to 6(b) are graphs that show a distribution of a mean $m_D$ without error;

DETAILED DESCRIPTION OF THE EMBODIMENTS

The following discussion of the embodiments of the invention directed to a system and method for providing dynamic channel equalization in a V2V and V2I communications system that employs an OFDM protocol is merely exemplary in nature, and is in no way intended to limit the invention or its applications or uses. For example, the channel equalization techniques discussed below have particular application for vehicle communications networks employing the IEEE 802.11p communications standard. However, as will be appreciated by those skilled in the art, these channel equalization techniques may have application for other protocols and other communications standards.

Figure 1:
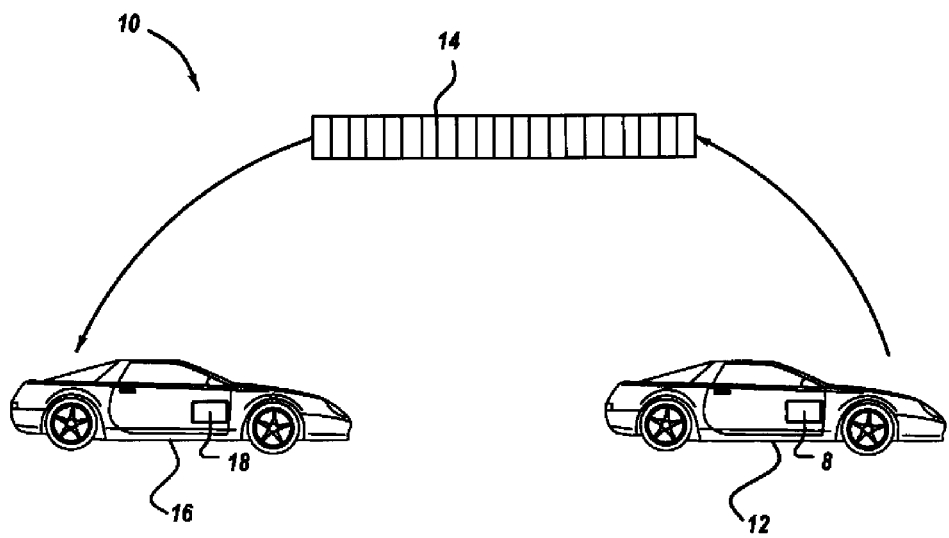
FIG. 1 is a plan view of a vehicle transmitting messages to another vehicle.

FIG. 1 is a diagram of a vehicular communications network 10 (also known as a communications system) showing a vehicle 12 in the network 10 transmitting a message 14 with a transmitter 8 to a receiver 18 in another vehicle 16 in the network 10 using the IEEE 802.11p communications standard discussed herein.

To test different estimation and equalization schemes for data transmission using the 802.11p communications standard, 802.11p waveforms were recorded over an actual V2V channel. In these real scenarios, one vehicle acted as the transmitter and another vehicle as the receiver. The transmitter vehicle was equipped with a digital signal generator (DSG) that produced the transmitted waveform. The receiver vehicle was equipped with a vector signal analyzer (VSA) that saved and demodulated the sampled waveform. The receiver processed time-sampled in-phase and quadrature phase (I&Q) packet waveforms, and performed time synchronization, frequency offset correction, initial channel estimation, demodulation and equalization.

The current technique for estimating and equalizing an 802.11a waveform, which has a similar structure to an 802.11p waveform, is to use a least-squares (LS) process for channel estimation. It should be noted that this method is identical to the maximum likelihood (ML) estimation of the channel.

Figure 2:
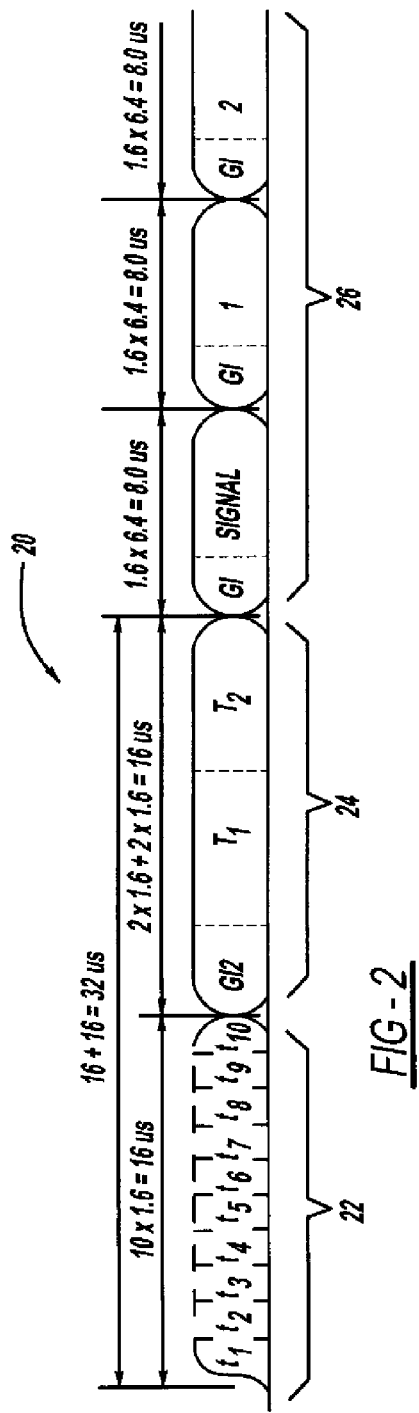
FIG. 2 is a packet structure for an IEEE 802.11p communications standard.

A packet structure 20 for a message using the 802.11p standard is shown in FIG. 2. The first ten short symbols 22 of the structure 20 are used for training synchronization, the two symbols 24 that follow the symbols 22, namely, $T_1$ and $T_2$, are used for estimating the channel, and the remaining part of the structure 20 is data 26 to be demodulated and decoded.

For the LS estimation process, first the time-domain symbols $T_1[n]$ and $T_2[n]$ are extracted from the received signal, and demodulated using an N-point fast Fourier transform (FFT) as $$Y_1(k) = \sum_{n=0}^{N-1} T_1[n]e^{-\frac{2\pi j}{N}kn}, \tag{1}$$

$$Y_2(k) = \sum_{n=0}^{N-1} T_2[n]e^{-\frac{2\pi j}{N}kn}. \tag{2}$$

Then, because the bits in the training symbols $T_1$ and $T_2$ are known by the receiver, the LS estimation process for both of the transmitted time-domain symbols $T_1[n]$ and $T_2[n]$ may be formulated as $$H_1 = Y_1/X_1, \tag{3}$$

$$H_2 = Y_2/X_2, \tag{4}$$

where $H_1$ and $H_2$ are channel frequency response functions for the channel estimations, $Y_1$ and $Y_2$ are the FFT values in vector form from Equations (1) and (2), and $X_1$ and $X_2$ are the known training vector values as defined by the 802.11p standard. Note that the divisions in Equations (3) and (4) are element-wise.

A final channel estimation frequency response H is then computed as $$H = \frac{(H_1 + H_2)}{2}. \tag{5}$$

The data 26 in the packet structure 20 is then equalized using the channel estimation frequency response H. For a given received symbol $S_R[n]$, the symbol is first demodulated using the FFT as $$S_R(k) = \sum_{n=0}^{N-1} S_R[n] e^{-\frac{2\pi}{N} j k n}. \tag{6}$$

The received FFT vector is then equalized using element-wise multiplication, such that the estimate $\hat{S}_T$ of the transmitted symbol $S_T$ is $$\hat{S}_T = S_R \cdot * H^{-1}. \tag{7}$$

Note that this is a simple, one-tap equalizer for each sub-carrier. Note also that the inversion of H is element-wise. This is repeated for all of the symbols in the packet. It is clear that if the channel changes significantly over the duration of a packet, the channel estimation frequency response H no longer accurately represents the channel, and equalization will actually begin to damage the received signal rather than correct it. Thus, an efficient technique for tracking the channel is crucial.

As mentioned above, the 802.11p communications standard allocates four pilot subcarriers to be used for center frequency offset tracking. Although not used in existing 802.11p implementations, it is known that the pilot subcarriers can be used in a comb pilot interpolation process to provide a more accurate channel estimate, as discussed below. The information known from the pilot subcarrier frequencies is interpolated to estimate the characteristics of the data subcarrier frequencies. In some OFDM schemes, a grid of pilot subcarriers spaced in both time and frequency allows the channel estimator to obtain feedback from the channel so as to equalize the signal. To capture the variation of the channel in both time and frequency, the pilot subcarriers must be spaced such that they fulfill the Nyquist criteria. However, because of the large spacing between the pilot subcarriers and the V2V channel's narrow correlation bandwidth, the pilot subcarriers in the 802.11p standard do not satisfy this criterion, and thus, do not provide sufficient feedback for channel equalization.

Despite this fact, some information about the channel is better than no information. This is especially true because the initial channel estimate expires before the end of the packet, so using the pilot subcarriers as feedback is the only guaranteed feedback mechanism.

With this scheme, each symbol S is demodulated. Then, the received frequency values of the pilot subcarriers −21, −7, 7 and 21 are extracted. These values are designated by the vector $Y_p$. Then, the LS estimates of the frequency response $H_p$ at the pilot subcarriers are formed using the known pilot data $X_p$ as $$H_p = Y_p / X_p. \tag{8}$$

Note that this gives a four element channel estimation frequency response vector $H_p$ that represents evenly spaced measurements of the channel. To interpolate these measurements, endpoints are appended to the channel estimation frequency response vector to form the augmented estimated frequency response $H'_p$ given by $$H'_p = [m_{H_p} H_p^T m_{H_p}]^T, \tag{9}$$

where $m_{H_p}$ is the mean of the pilot channel estimation frequency response $H_p$. The mean $m_{H_p}$ is used on the endpoints because there is no way of determining the actual channel response at the edge frequencies and is used to allow for a reasonable interpolation result.

Next, the augmented channel estimation frequency response vector $H'_p$ is passed through an interpolation circuit. Interpolation is a mathematical process that provides new data points within a range of a discrete set of known data points to construct a function that closely fits to those data points. In the interpolation process discussed herein, the interpolation circuit places L−1 zeros between each sample in the augmented channel estimation frequency response vector $H'_p$ and passes the resulting signal through a low-pass filter having a cutoff frequency π/L, where L is 14.

Figure 3:
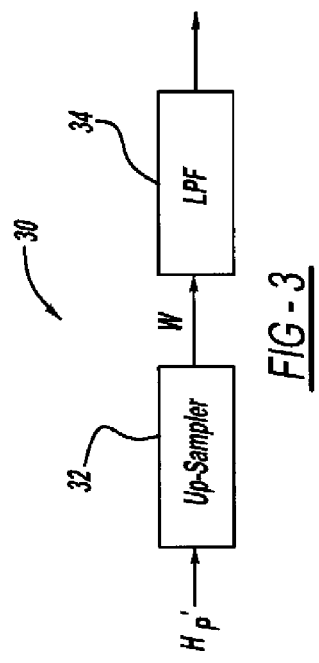
FIG. 3 is a block diagram of an interpolation circuit.

FIG. 3 is a block diagram of an interpolation circuit 30 suitable for this purpose. It is noted that the interpolation circuit 30 is by no means limiting, and any type of interpolation circuit suitable for the purposes described herein can be employed. The interpolation circuit 30 includes an up-sampler 32 that receives the augmented channel estimation frequency response vector $H'_p$, and performs an up-sampling operation on the input such that $$W[n] = \begin{cases} H'_p[n/L], & \mod(n/L) = 0 \\ 0, & \text{otherwise.} \end{cases} \tag{10}$$

Figure 4:
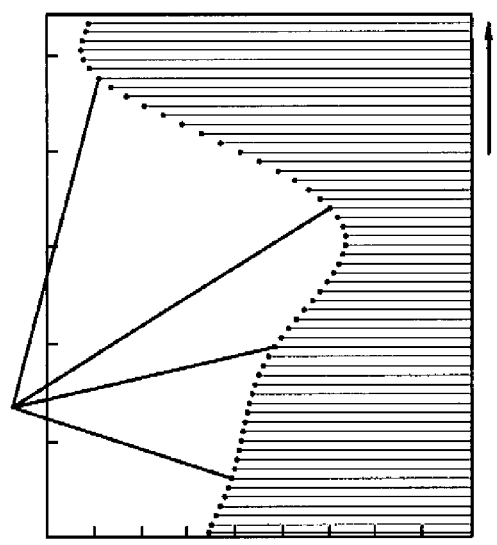
FIG. 4 is a graph with frequency on the horizontal axis and channel estimation on the vertical axis showing interpolation results from the circuit shown in FIG. 3.

Note that indexing in this case starts at n=0. The up-converted value W is then sent to a low-pass filter (LPF) 34, where the output of the low-pass filter 34 is designated as an update channel estimation frequency response $H_{update}$. The update channel estimation frequency response $H_{update}$ is appropriately trimmed on both sides to account for the lag of the filter 34 and the extra values on the tail ends. An example of the result of this interpolation that gives the update channel estimation frequency response $H_{update}$ for each of the 52 subcarriers is shown by the graph in FIG. 4.

Once the update channel estimation frequency response $H_{update}$ is obtained for the pilot subcarriers using the interpolation circuit 30, the channel is estimated at a given symbol S and the overall channel estimate is appropriately updated to track the channel.

Since a given updated frequency response $H_{update}$ will generally have errors owing to noise, smoothing can be added in time as well as frequency. In this case interpolation is not necessary, since each symbol contains the same pilot subcarriers, and the symbol rate is such that the Nyquist rate for temporal variations of the channel is easily satisfied. One way to perform the smoothing in time is to obtain the new channel estimate from a weighted average of the previous estimate and the current update. Using this approach, the new channel estimation frequency response $H_t$ at symbol time t is given by $$H_t = \left(1 - \frac{1}{\alpha}\right) H_{t-1} + \frac{1}{\alpha}(H_{update}), \quad (11)$$

where, α is a memory parameter. A larger memory parameter α implies longer memory. The channel estimation frequency response $H_t$ is more accurate than that provided by the known channel estimation technique, shown in Equation (5), because it includes the updated channel estimation frequency response $H_{update}$. It will be clear to those skilled in the art that if pilots do not appear in each symbol, then interpolation in time can also be used in a manner analogous to that used with the frequency response.

Once the channel is estimated, the estimated symbol transmitted at time t, $\hat{S}_{T,t}$ is given by $$\hat{S}_{T,t} = S_{R,t} \cdot {}^*H_t^{-1}. \quad (12)$$

The estimated symbol $\hat{S}_{T,t}$ produced as a result of the interpolation is more accurately estimated using the channel estimation frequency response $H_t$. This procedure continues until all of the symbols S in the packet structure 20 have been equalized.

As mentioned above, the comb pilot subcarriers that are present in the 802.11p standard do not sufficiently sample the channel in frequency. More accurate estimates of the behavior of the channel between pilot tones, can be obtained using the data subcarriers. Estimating the channel with data is inherently unreliable because such estimations assume that the data was demodulated correctly.

In the present invention a comb copilot interpolation scheme for channel equalization is proposed in which, several "copilot" subcarriers can be defined from data subcarrier information. These copilot subcarriers are evenly spaced with the pilot subcarriers such that the interpolation scheme works properly. Before forming these copilot subcarriers, the estimated transmitted symbol at time t, $\hat{S}_{T,t}$ must be equalized with the previous channel estimate before it is updated as $$\hat{S}_{T,t} = S_{R,t} \cdot {}^*H_{t-1}^{-1}. \quad (13)$$

Once this is done, then the channel estimate at a subcarrier frequency λ may be formed from the bit decision at this subcarrier as $$H_\lambda = Y_\lambda / X_\lambda, \quad (14)$$

where $H_\lambda$ is the channel estimation frequency response at a subcarrier frequency λ, $Y_\lambda$ is the received value, and $X_\lambda$ is the symbol value corresponding to the decided bit(s).

Again, errors can occur in $H_\lambda$ owing to noise. This noise can be reduced by smoothing in frequency. One way to do this is to form the copilot channel estimate from a linear combination of channel estimates of the data subcarriers in its vicinity. For example, the copilot channel estimation frequency response $H_{cp}$ at subcarrier λ is formed as $$H_{cp} = 0.25 H_{\lambda-1} + 0.5 H_\lambda + 0.25 H_{\lambda+1}. \quad (15)$$

The weights in Equation (15) are changed slightly for different situations. For example, if the channel estimation frequency response $H_{\lambda-1}$ or $H_{\lambda+1}$ are from pilot subcarriers, their weight is increased relative to the other terms in Equation (15). If the channel estimation frequency response $H_{\lambda-1}$ or $H_{\lambda+1}$ does not exist at the edges of the channel they are excluded from Equation (15) and the weights are adjusted accordingly. If a copilot subchannel needs to be formed outside of the subcarrier range, a copilot frequency at −26 or 26 is used instead at this location to preserve the equidistance between pilots and copilots. Finally, if a copilot subchannel needs to be formulated at the zero subcarrier location, the channel estimates for subcarriers at −1 and 1 are given by $$H_{cp,0} = 0.5 H_{-1} + 0.5 H_1. \quad (16)$$

The weights appearing in Equations (15) and (16) are conveniently implemented digitally since they are powers of two. However, one skilled in the art will understand that other values and other types of smoothing in frequency could be used with similar effect. For example, Equations (15) and (16) are special cases of the form $$H_{cp,\lambda} = \frac{1}{2\beta+1} \sum_{k=-\beta}^{\beta} W_k H_{i,\lambda+k} \quad (17)$$

where $W_k$ is the weight applied to kth term in the sum.

After the necessary copilot frequencies are extracted, the channel estimation frequency response $H_{p/cp}$ for the pilot and copilot subcarriers is formed from the evenly-spaced copilot subcarriers and the pilot subcarriers. The channel estimation frequency response $H_{p/cp}$ is passed through the interpolation circuit 30, as discussed above.

FIGS. 5(*a*)-5(*c*) illustrate a comparison between the pilot interpolation scheme discussed above and two copilot interpolation schemes for a channel 40 including the 52 subcarriers, where reference number 42 represents the data subcarriers, reference number 44 represents the pilot subcarriers and reference number 46 represents the data subcarriers used as pilot subcarriers. FIG. 5(*a*) shows the channel 40 using the comb pilot interpolation process, FIG. 5(*b*) shows the channel 40 using the comb copilot interpolation process with a gap of L=7 and FIG. 5(*c*) shows the channel 40 using the comb copilot interpolation process with a gap of L=3.

After symbol demodulation, copilot formation, and subsequent interpolation, the updated channel estimation frequency response $H_{update}$ is formed. As in the comb pilot interpolation scheme, the channel estimation frequency response $H_t$ is then updated with a moving average in the same manner using Equation (11). Unlike the comb pilot interpolation scheme, this channel estimate is used to equalize the next symbol before it is updated again.

The comb copilot interpolation scheme blindly assumes that copilot subcarriers are formed accurately from correctly received data. However, if this is not the case, the channel estimation frequency response $H_t$ will be wrong. The averaging provided by Equations (15) and (16) helps to prevent this possibility, but it does not eliminate it. A better technique would be to develop a technique for measuring the confidence for using a data subcarrier to estimate the channel. Then, only data subcarriers with a high probability of being correct are used to estimate the channel. The present invention proposes a constellation aware data equalization (CADE) technique, discussed below, that takes a statistical approach to determine which data subcarriers should be used for channel estimation.

The foundation of the CADE technique relies on the use of BPSK on all data subcarriers, but could be extended to other constellation schemes. When demodulating the OFDM waveform using a fast Fourier transform (FFT), the resulting complex numbers at each subcarrier position map directly to the points in a constellation pattern. This constellation pattern is shown in FIGS. 6(*a*) and 6(*b*), where FIG. 6(*a*) shows all of the demodulated data points for a packet with no errors. In this case, all of the data could be used to estimate the channel without making errors. In FIG. 6(*b*), a packet that has several errors is shown where the open dots around the origin identify the errors. Therefore, it is important to determine a probability model to determine which data points can be used to safely estimate the channel without significant error.

First, the real part $P_i$ of the $i^{th}$ data point is modeled in the symbol constellation as a sum of two random variables $N_i$ and $D_i$ as $$P_i = N_i + D_i, \tag{18}$$

where, $N_i$ is normal as $\sim N(0, \sigma_n^2)$, and models noise and channel effects, and $D_i$ is a special kind of Bernoulli trial, and where $$D_i = \begin{cases} 1, & \text{with probability } 0.5 \\ -1 & \text{with probability } 0.5. \end{cases} \tag{19}$$

This operates under the assumption that the data is sufficiently scrambled and coded such that 1's and 0's are equal in number for a given packet. The goal is to determine the variance of the vector $N(\sigma_n^2)$ for each symbol. The variance of the vector P can be written as $$\text{Var}(P) = \text{Var}(N+D) = \text{Var}(N) + \text{Var}(D). \tag{20}$$

Solving for the variance $\sigma_n^2$ gives $$\text{Var}(N) = \sigma_n^2 = \text{Var}(P) - \text{Var}(D). \tag{21}$$

The variance of the constellation points can be determined experimentally, and is given by the expression $$\text{Var}(P) = \frac{1}{n} \sum_{i=1}^{n} (P_i - m_p)^2 = \frac{1}{n} \sum_{i=1}^{n} P_i^2 - m_p^2, \tag{22}$$

where n is 48 because there are 48 data subcarriers and the mean $m_p$ of the constellation is calculated as $$m_p = \frac{1}{n} \sum_{i=1}^{n} P_i. \tag{23}$$

Next, the variance of the random variable D is determined as $$\text{Var}(D) = \frac{1}{n} \sum_{i=1}^{n} (D_i - m_D)^2 \tag{24}$$
$$= \frac{1}{n} \sum_{i=1}^{n} D_i^2 - m_D^2$$
$$= 1 - m_D^2.$$

In theory, the mean $m_D$ of the variable D is equal to 0, implying $$\text{Var}(D) = 1^2 - 0 = 1. \tag{25}$$

However, because the sample size is only 48 points, the true variance of the variable D for a given symbol may not be equal to 1. This is because the variance of D is only equal to 1 if there is an equal number of 1s and 0s transmitted in a given symbol. If this is not the case, then the term $m_D^2$ will deviate from 0. Therefore, it is necessary to determine the distribution of the experimental mean $m_D$ of the data points. This will lead to an expression for the distribution of the possible values of Var(D), where the mean $m_D$ of the variable D is given by $$m_D = \frac{1}{n} \sum_{i=1}^{n} D_i. \tag{26}$$

Because the variable $D_i$ is similar to a Bernoulli trial, the distribution of the mean $m_D$ is a type of binomial. A standard binomial distribution for a discrete random variable s whose Bernoulli trials take on values of 0 or 1 is given by $$P(s = K) = \binom{n}{k} p^k (1-p)^{n-k}, \tag{27}$$

where k is the number of 1s, (n−k) is the number of 0s, p is the probability of a 1 occurring, and (1−p) is the probability of a 0 occurring.

If the probabilities of 1s and 0s are the same, Equation (27) simplifies to $$P(s = K) = \binom{n}{k} 0.5^k 0.5^{n-k} = \binom{n}{k} 0.5^n. \tag{28}$$

Figure 7:
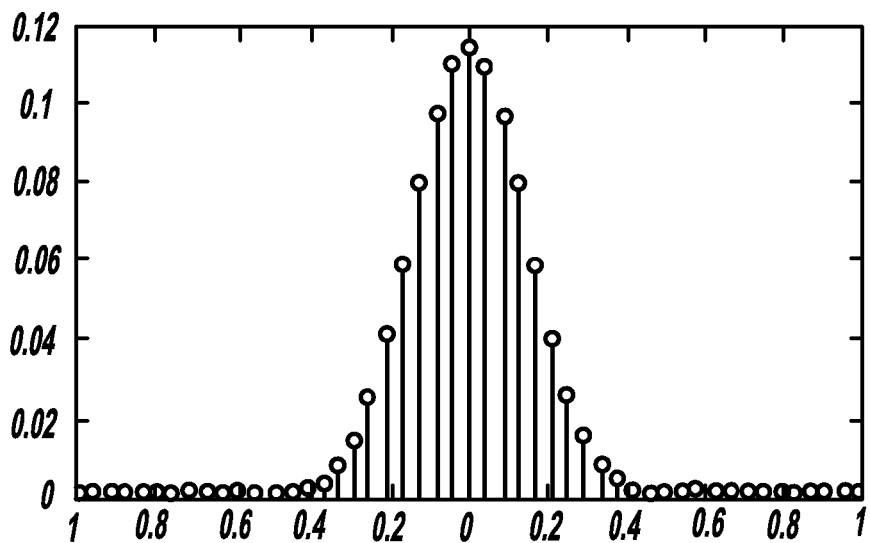
FIG. 7 is a graph showing a distribution of the mean $m_D$ with error.

In this case, because there are 1s and −1s, as opposed to 0s, the binomial of Equation (28) can be written in the form $$P\left(m_D = \frac{b}{n}\right) = \binom{n}{k} 0.5^n, \tag{29}$$

where, $k = \{0, 1, \ldots, n\}$ and $b = 2k-n$. The reason for this indexing is to ensure that the x values of the distribution of the mean $m_D$ are at the correct values. The distribution of the mean $m_D$ is shown in FIG. 7.

Figure 8:
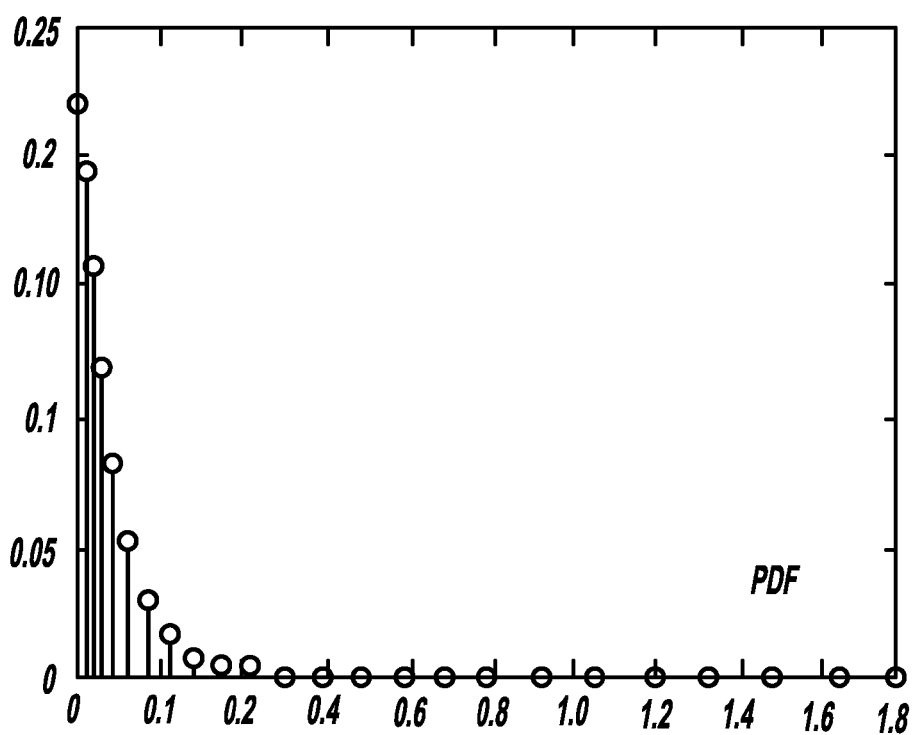
FIG. 8 is a graph showing the PDF of the mean $m_D$.
Figure 9:
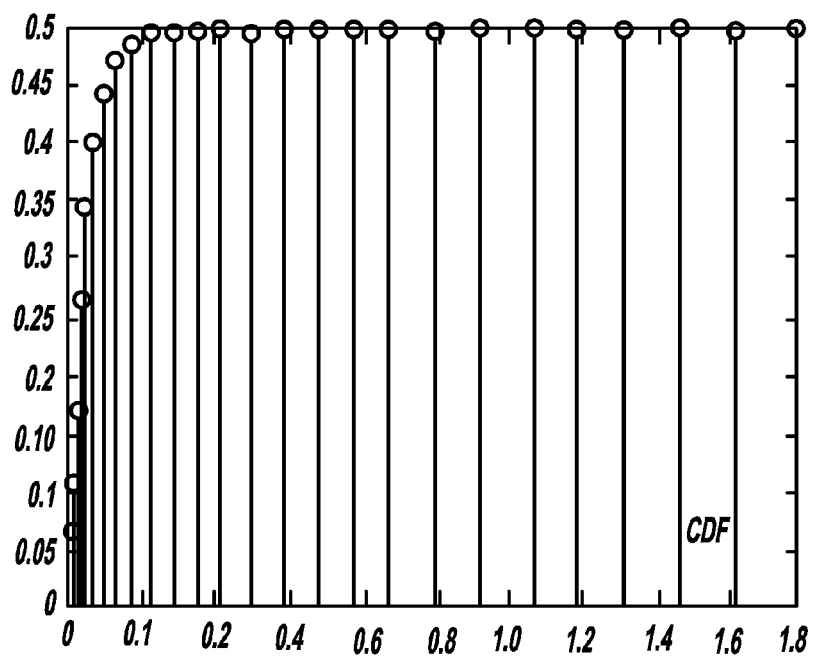
FIG. 9 is a graph showing the CDF of the mean $m_D$.

The distribution of the square of the mean $m_D^2$ can be determined from Equation (29) as $$P\left(m_D^2 = \frac{(2c)^2}{n^2}\right) = \begin{cases} \binom{n}{n/2} 0.5^n, & c = 0 \\ 2\binom{n}{n/2-c} 0.5^n, & c = 1, 2, \ldots, 24 \end{cases} \tag{30}$$

where, c is an indexing variable ($c = \{0, 1, \ldots, 24\}$). Plots for the PDF and CDF of the square of the mean $m_D^2$ are shown in FIGS. 8 and 9, respectively.

Combining Equations (21), (22) and (24) gives $$\sigma_n^2 = \frac{1}{n} \sum_{i=1}^{n} P_i^2 - m_p^2 - 1 + m_D^2. \tag{31}$$

Note that the square of the mean $m_D^2$ is always positive. If an equal number of 1s and −1s is assumed, then the square of the mean $m_D^2$ becomes 0. However, the PDF plot in FIG. 8 shows that there is a significant non-zero probability that this is not the case. Therefore, by assuming that the square of the mean $m_D^2$ takes a sufficiently large value, the estimate of the variance $\sigma_n^2$ becomes more conservative. This essentially means that the determination of a threshold, discussed below, is safer. Typically, a value for the square of the mean $m_D^2$ can be determined by looking at its CDF and choosing the square of the mean $m_D^2$ such that CDF $(m_D^2) \approx 1$.

Figure 10:
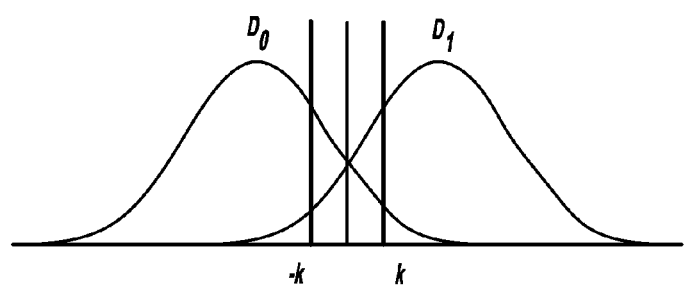
FIG. 10 is a graph showing distributions $D_0$ and $D_1$.

From this analysis, there are clusters of data, namely one centered at 1 and the other centered at −1. Points around each cluster have the variance $\sigma_n^2$. Using this variance, a threshold±k can be determined such that data points to the left or right of these thresholds can be used to help estimate the channel. Data points fall in two normal distributions $D_0$ and $D_1$, as shown in FIG. 10.

Figure 11:
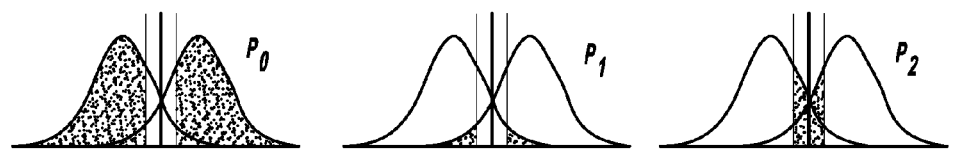
FIG. 11 is a graph showing three regions of interest $P_0$, $P_1$ and $P_2$.

There are three regions of interest. First, region $P_0$ represents data points that fall above the threshold and are demodulated correctly. Region $P_1$ represents data points that fall above the threshold, but are demodulated incorrectly. Finally, region $P_2$ represents the rest of the data points, which fall between the thresholds −k and k. For clarity, the regions $P_0$, $P_1$ and $P_2$ are shown in FIG. 11, where the speckled area shows the region.

A confidence parameter C is developed that will serve as a measure of the likelihood that the point of interest is correctly demodulated from region $P_0$ rather than incorrectly demodulated from region $P_1$. The latter would result in an erroneous estimation of the channel for that subcarrier. The confidence parameter C is defined as $$C = \frac{P_0}{P_0 + P_1}, \quad (32)$$

where the region $P_0$ is expressed as $$P_0 = P(x < -k | D_0)P(D_0) + P(x > k | D_1)P(D_1) \quad (33)$$
$$= P(x < -k | D_0)(0.5) + P(x > k | D_1)(0.5)$$
$$= P(x > k | D_0)$$
$$= Q\left(\frac{k + -1}{\sigma_n}\right),$$

and the region $P_1$ is expressed as $$P_1 = P(x < -k | D_1)P(D_1) + P(x > k | D_0)P(D_0) \quad (34)$$
$$= P(x < -k | D_1)(0.5) + P(x > k | D_1)(0.5)$$
$$= P(x > k | D_0)$$
$$= Q\left(\frac{k + 1}{\sigma_n}\right),$$

Combining Equations (32)-(34) gives $$C = \frac{Q\left(\frac{k-1}{\sigma_n}\right)}{Q\left(\frac{k-1}{\sigma_n}\right) + Q\left(\frac{k+1}{\sigma_n}\right)}. \quad (35)$$

Since $$Q(x) = \frac{1}{2} - \frac{1}{2}\text{erf}\left(\frac{x}{\sqrt{2}}\right), \quad (36)$$

Equation (35) can be expressed as $$C = f(k, \sigma_n) = \frac{1 - \text{erf}\left(\frac{k-1}{\sqrt{2}\sigma_n}\right)}{2 - \text{erf}\left(\frac{k-1}{\sqrt{2}\sigma_n}\right) - \text{erf}\left(\frac{k+1}{\sqrt{2}\sigma_n}\right)}. \quad (37)$$

Thus, given a desired confidence parameter C and the calculated variance $\sigma_n$, the threshold k can be solved and look-up tables for the threshold k can be generated for a number of given values of the confidence parameter C and variance $\sigma_n$. This is done numerically by solving $$\min_{k>0}(|C - f(k,\sigma_n)|).$$

When a packet is received, each symbol is demodulated initially using the comb pilot interpolation scheme, as discussed above. At each data subcarrier, a channel estimate frequency response is formed, such as by using Equation (14). Then, the variance $\sigma_n$ of the noise of the constellation is calculated. From this and a specified confidence parameter C, look-up tables are used to determine the threshold k. All data subcarriers whose received signal falls above the threshold k are then used to form the updated channel estimate. When forming the updated channel estimation frequency response $H_{update}$, a simple scheme replaces the value in the pilot interpolation channel estimation frequency response $H_y$ with the data derived channel estimate from Equation (14). In a more sophisticated process, i.e., through more computationally intensive technique, piecewise linear interpolation can be formed between pilot subcarriers and data subcarriers that fall above the threshold k. After each symbol is demodulated, the estimate is updated as a moving average, and is applied to the next symbol. Note that in the basic CADE technique as described here, averaging of nearby frequency estimates is not used. Instead, single estimates are used that correspond to subcarriers with high confidence for correct data demodulation.

Figure 12:
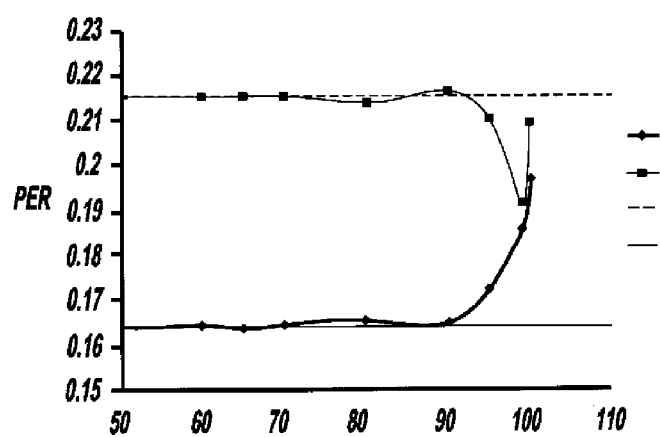
FIG. 12 is a graph with confidence parameter percentage on the horizontal axis and PER on the vertical axis showing a comparison between CADE and averaged CADE techniques.

As shown in FIG. 12, the CADE technique performs well, but its performance is very dependent on the confidence parameter C. If the confidence parameter C is too low, then k=0 and all of the data points are used to equalize the channel. As the confidence parameter C increases, fewer copilots with errors are used, and the PER decrease. The PER reaches a minimum at an optimal confidence parameter C. At this value, most of the data used for the estimation is data that has been received correctly. Therefore, performance is quite good, and the PER decreases significantly. If the confidence parameter C increases from this point, the threshold k continues to increase and less data is used to estimate the channel, until the point at which all of the data falls below the threshold k. At this point in time, performance degrades and the scheme reduces to comb pilot interpolation. It can be concluded that CADE offers a performance improvement, but one that is sensitive to the choice of the confidence parameter C.

A further improvement is to add the use of averaging in frequency to CADE. This helps reduce the effect of errors by adding redundancy in much the same way the copilot interpolation scheme used averaging in Equation (15). The idea behind this is to have multiple measurements of the channel at a given subcarrier location. When more data subcarriers are used to form the average, the accuracy increases because the probability of multiple errors over a block of subcarriers is smaller than the probability of making an error at a given subcarrier. However, if too many data subcarriers are used to form the average, then the resulting estimate will not be as accurate, because the coherence frequency of the channel is narrow compared to the spectrum of the signal.

FIG. 12 shows the results of averaging the CADE technique compared with CADE without averaging. Averaging clearly reduces the PER, and also reduces the sensitivity to the confidence parameter C. In fact, the best performance is obtained when all of the data subcarriers are used (k=0) to formulate a channel estimate at each symbol, and the resulting estimates are averaged in both time and frequency. This method is a third improvement offered by the present invention and is formalized below.

A spectral temporal averaging estimation (STAE) technique for this method can be formalized as follows. First, the initial channel estimate is obtained from the training preamble as in Equation (5). This initial estimate is applied to the first symbol in the packet. Once this symbol is demodulated, a channel estimation frequency response $H_i$ is formed as $$H_i = Y_i/X_i, \qquad (39)$$

where, $Y_i$ is the received constellation pattern at symbol i, $X_i$ is the demodulated symbol values at symbol i, and $H_i$ is the channel estimation frequency response formed at a given symbol. Note that the vector division here is element-wise.

The channel estimation frequency response $H_i$ is first averaged in frequency. The average is constructed as a simple moving average, such that the estimate at the subcarrier frequency $\lambda$ is formed as $$H_{update,\lambda} = \frac{H_{i,\lambda-\beta} + \cdots + H_{i,\lambda-1} + H_\lambda + H_{i,\lambda+1} + \cdots + H_{i,\lambda+\beta}}{2\beta+1}, \qquad (40)$$

where $\beta$ is a parameter that determines the number of terms included in the average.

It will be clear to those skilled in the art that other methods of frequency averaging could be used, and that Equation (40) is simply a special case of $$H_{update,\lambda} = \frac{1}{2\beta+1} \sum_{k=-\beta}^{\beta} W_k H_{i,\lambda+k}, \qquad (41)$$

where $W_k$ is the weight applied to the kth term in the sum.

After this is done for all 52 subcarriers, the new channel estimation frequency response $H_{update}$ is updated as $$H_{STA,t} = \left(1 - \frac{1}{\alpha}\right) H_{STA,t-1} + \frac{1}{\alpha}(H_{update}), \qquad (42)$$

where $\alpha$ is a moving average parameter in time. Note that the channel estimation frequency response $H_{STA,0}$ is the initial channel estimated obtained from the preamble estimation. The channel estimation frequency response $H_{STA,t}$ is then applied to the next symbol's equalization, and the process is repeated until the packet is completely demodulated.

Each demodulation and equalization scheme discussed above was tested on real packets from an actual V2V channel in three environments, namely, highway, rural and suburban.

Table 1 below lists the overall PER results obtained from these tests. The spectral-temporal averaging method can be seen to clearly out-perform the standard least-squares scheme.

TABLE 1

PER in different environments

| Scheme | Highway | Rural | Suburban |
|---|---|---|---|
| Least Squares | 38.83% | 38.23% | 61.46% |
| Comb Pilot | 23.79% | 22.37% | 39.50% |
| Comb Copilot | 19.92% | 16.34% | 38.81% |
| Spectral Temporal | 16.83% | 14.69% | 38.63% |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

Figure 13:
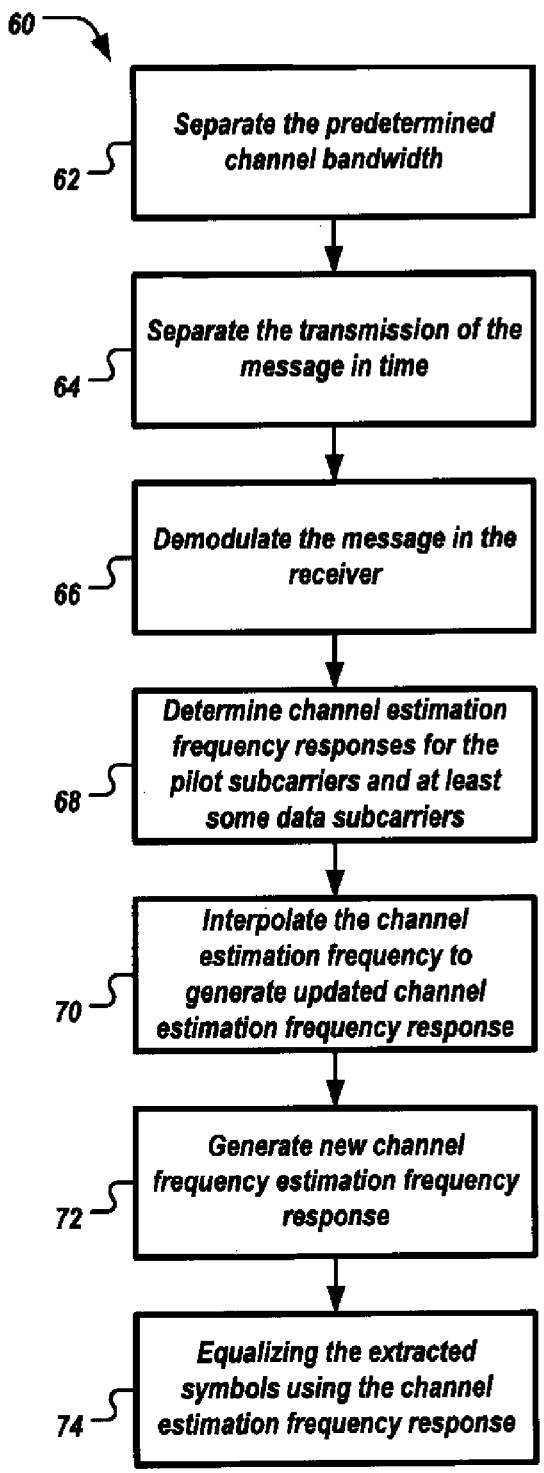
FIG. 13 is a flowchart of a method for providing channel equalization.

FIG. 13 is a flowchart 60 of a method for providing channel equalization of a message transmitted from a transmitter to a receiver using a predetermined transmission protocol and having a predetermined channel bandwidth. The flowchart starts at box 62, by separating the channel bandwidth into a plurality of subcarriers having different subcarrier frequencies, where the subcarriers include data subcarriers and pilot subcarriers. Next, at box 64, the method separates the transmission of the message in time into a plurality of symbols transmitted at different times where the transmission of the message includes both data symbols and pilot symbols. Next, at box 66, the method demodulates the message in the receiver to extract the symbols from the message. Next, at box 68, the method determines the channel estimation frequency responses for the pilot subcarriers and at least some of the data subcarriers using a least-squares estimation process and the extracted symbols. Next, at box 70, the method interpolates the channel estimation frequency responses for both the pilot subcarriers and the data subcarriers to generate updated channel estimation frequency responses. Next, at box 72, the method generates new channel frequency estimation frequency responses for each extracted symbol using a previous channel estimation frequency response and the updated channel estimation frequency responses. Finally, at box 74, the method equalizes the extracted symbols using the new channel estimation frequency responses.

What is claimed is:

1. A method for providing channel equalization of a message transmitted from a transmitter to a receiver in a communications system using a predetermined transmission protocol and having a predetermined channel bandwidth, said method comprising:

separating the predetermined channel bandwidth into a plurality of subcarriers each having a different subcarrier frequency where the subcarriers include data subcarriers and pilot subcarriers;

separating the transmission of the message in time into a plurality of symbols transmitted at different times where the transmission of the message includes both data symbols and pilot symbols;

demodulating the message in the receiver to extract a set of extracted symbols representing the plurality of symbols transmitted at different times from the message;

determining channel estimation frequency responses for the pilot subcarriers and at least some of the data subcarriers using a least-squares estimation process and the set of extracted symbols;

interpolating the channel estimation frequency responses for both the pilot subcarriers and the data subcarriers to generate updated channel estimation frequency responses;

generating new channel estimation frequency responses for each extracted symbol from the set of extracted symbols using a previous channel estimation frequency response and the updated channel estimation frequency responses; and equalizing the extracted symbols from the set of extracted symbols using the new channel estimation frequency responses.

2. The method according to claim 1 wherein a particular subcarrier is a pilot subcarrier in some symbols from the plurality of symbols and a data subcarrier in other symbols from the plurality of symbols.

3. The method according to claim 2 further comprising equalizing a previous set of symbols from a previous channel estimation frequency response before identifying the data subcarriers that are used to determine the channel estimation frequency responses and generating data subcarrier channel estimation frequency responses at a subcarrier frequency for the data subcarriers by weighting each channel estimation frequency response at the subcarrier frequency and weighting the channel estimation frequency responses at adjacent subcarrier frequencies, and then using the data subcarrier channel estimation frequency responses for the interpolation.

4. The method according to claim 3 wherein equalizing the previous set of symbols from the previous channel estimation frequency response uses the Equation $$\hat{S}_{T,t} = S_{R,t} * H_{t-1}^{-1},$$

where $\hat{S}_{T,t}$ is an estimated transmitted symbol at time t, $S_{R,t}$ is a received symbol at time t and $H_{t-1}^{-1}$ is the inverse of the previous channel estimation frequency response.

5. The method according to claim 4 wherein determining the channel estimation frequency responses for the pilot subcarriers includes using the Equation $$H_\lambda = Y_\lambda / X_\lambda,$$

where $H_\lambda$ is a subcarrier channel estimation frequency response, $Y_\lambda$ is the subcarrier frequencies and $X_\lambda$ is the information on the pilot subcarriers.

6. The method according to claim 5 further comprising defining a plurality of copilot subcarriers within the data subcarriers and providing average channel estimation frequency response updates for the copilot subcarriers using the Equation $$H_{cp,\lambda} = \frac{1}{2\beta+1} \sum_{k=-\beta}^{\beta} W_k H_{i,\lambda+k},$$

where $\lambda$ is a subcarrier frequency, k is a sample number, $H_{cp,\lambda}$ is the updated channel estimation frequency responses at a particular copilot frequency, $H_{i,\lambda}$ is the channel estimation frequency responses of the particular copilot frequency at symbol i from the plurality of symbols transmitted at different times, $W_k$ is the weight applied to the estimate $H_{i,\lambda+k}$ and $\beta$ is a parameter that affects how many terms are including in the average channel estimation frequency response updates.

7. The method according to claim 6 wherein the weight $W_k=1$ and the average channel estimation frequency response updates for the copilot subcarriers use the Equation $$H_{cp,\lambda} = \frac{H_{i,\lambda-\beta} + \cdots + H_{i,\lambda-1} + H_{i\lambda} + H_{i,\lambda+1} + \cdots + H_{i,\lambda+\beta}}{2\beta+1}.$$

8. The method according to claim 6 wherein the weights are chosen so that the average channel estimation frequency response updates for the copilot subcarriers use the Equation $$H_{cp} = 0.25 H_{\lambda-1} + 0.5 H_\lambda + 0.25 H_{\lambda+1}.$$

9. The method according to claim 6 wherein generating the new channel estimation frequency responses includes using the Equation $$H_t = \left(1 - \frac{1}{\alpha}\right) H_{t-1} + \frac{1}{\alpha}(H_{update}),$$

where $H_t$ are the new channel estimation frequency responses, $H_{t-1}$ are the previous channel estimation frequency responses, $H_{update}$ are the updated channel estimation frequency responses obtained using interpolation from the pilot and copilot channel estimation frequency responses, and $\alpha$ is a memory parameter.

10. The method according to claim 2 wherein determining the channel estimation frequency responses includes determining channel estimation frequency responses for all of the data subcarriers and then determining which of those frequency responses have a confidence parameter that exceeds a predetermined threshold where only those data subcarrier frequency responses that have the confidence parameter that exceed the threshold are interpolated and used for the equalization.

11. The method according to claim 10 wherein determining whether the confidence parameter exceeds the threshold includes modeling data points in a symbol constellation to identify a variable, determining a variance of the variable, determining the mean of a distribution of the variable, generating the confidence parameter as a determination of where a data point falls in the distribution and disregarding those data points that fall in the distribution below the threshold.

12. The method according to claim 11 wherein the confidence parameter is determined by the Equation $$C = f(k, \sigma_n) = \frac{1 - \mathrm{erf}\left(\frac{k-1}{\sqrt{2}\sigma_n}\right)}{2 - \mathrm{erf}\left(\frac{k-1}{\sqrt{2}\sigma_n}\right) - \mathrm{erf}\left(\frac{k+1}{\sqrt{2}\sigma_n}\right)},$$

where C is the confidence parameter, k is the threshold and $\sigma_n$ is the variance.

13. The method according to claim 2 wherein determining the channel estimation frequency responses includes determining channel estimation frequency responses for all of the data subcarriers.

14. The method according to claim 13 wherein determining the channel estimation frequency responses for all of the subcarriers includes providing an average channel estimation frequency response for all of the channel estimation frequency responses.

15. The method according to claim 14 wherein providing the average channel estimation frequency responses includes using the Equation $$H_{update,\lambda} = \frac{1}{2\beta+1} \sum_{k=-\beta}^{\beta} W_k H_{i,\lambda+k},$$

where k is a sample number, $H_{update,\lambda}$ is the updated channel estimation frequency response at a particular frequency, $H_{i,\lambda}$ is the channel estimation frequency response of the particular frequency at symbol i from the plurality of symbols transmitted at different times, $W_k$ is the weight applied to the estimate $H_{i,\lambda+k}$ and β is a parameter that affects how many terms are included in the average channel estimation frequency responses.

16. The method according to claim 15 wherein the weight $W_k=1$ and the average channel estimation frequency responses use the Equation $$H_{update,\lambda} = \frac{H_{i,\lambda-\beta} + \cdots + H_{i,\lambda-1} + H_{i,\lambda} + H_{i,\lambda+1} + \cdots + H_{i,\lambda+\beta}}{2\beta+1}.$$

17. The method according to claim 15 wherein the weights are chosen so that the average channel estimation frequency responses use the Equation $$H_{update} = 0.25 H_{\lambda-1} + 0.5 H_\lambda + 0.25 H_{\lambda+1}.$$

18. The method according to claim 15 wherein generating the new channel estimation frequency responses includes using the Equation $$H_t = \left(1 - \frac{1}{\alpha}\right) H_{t-1} + \frac{1}{\alpha}(H_{update}),$$

where $H_t$ are the new channel estimation frequency responses, $H_{t-1}$ are the previous channel estimation frequency responses, $H_{update}$ are the updated channel estimation frequency responses, and α is a memory parameter.

19. The method according to claim 1 wherein the communications system is a vehicle-to-vehicle or a vehicle-to-infrastructure communications system.

20. The method according to claim 1 wherein the communications system uses the IEEE 802.11p communications standard.

* * * * *